US010927666B2

(12) United States Patent
Skinner et al.

(10) Patent No.: US 10,927,666 B2
(45) Date of Patent: Feb. 23, 2021

(54) SYSTEMS AND METHODS FOR SURFACE DETECTION OF ELECTROMAGNETIC SIGNALS FROM SUBSURFACE ENVIRONMENTS (71) Applicant: HALLIBURTON ENERGY SERVICES, INC., Houston, TX (US)

(72) Inventors: Neal Gregory Skinner, Lewisville, TX (US); Etienne Samson, Cypress, TX (US); Tasneem Mandviwala, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 218 days.

(21) Appl. No.: 15/773,538

(22) PCT Filed: Dec. 15, 2015

(86) PCT No.: PCT/US2015/065830
§ 371 (c)(1),
(2) Date: May 3, 2018

(87) PCT Pub. No.: WO2017/105410
PCT Pub. Date: Jun. 22, 2017

(65) Prior Publication Data
US 2018/0320509 A1    Nov. 8, 2018

(51) Int. Cl.
*E21B 47/135* (2012.01)
*G01V 3/26* (2006.01)
(Continued)

(52) U.S. Cl.
CPC ............ *E21B 47/135* (2020.05); *E21B 47/06* (2013.01); *E21B 47/125* (2020.05); *G01V 3/26* (2013.01); *G01V 3/34* (2013.01)

(58) Field of Classification Search
CPC ...... E21B 47/123; E21B 47/06; E21B 47/121; E21B 47/135; G01V 3/26; G01V 3/34
See application file for complete search history.

(56) References Cited

U.S. PATENT DOCUMENTS 6,781,520 B1    8/2004  Smith et al.
7,000,692 B2 *  2/2006  Hosie .................. E21B 47/09
                                                    166/66
(Continued)

FOREIGN PATENT DOCUMENTS

WO        2014120305 A1    8/2014
WO   WO-2014120305 A1 *   8/2014  ............... G01V 8/10
(Continued)

OTHER PUBLICATIONS

International Search Report and Written Opinion; PCT Application No. PCT/US2015/065830; dated Dec. 15, 2015.

*Primary Examiner* — Amine Benlagsir
(74) *Attorney, Agent, or Firm* — Polsinelli PC (57) ABSTRACT Electromagnetic field monitoring methods and systems for obtaining data corresponding to subsurface rock formations. An electromagnetic field monitoring system includes an electromagnetic transmitter located downhole in a well bore and configured to radiate electromagnetic radiation into a subsurface formation; a fiber optic cable coupled with a fiber optic interrogator, the at least one fiber optic cable and the interrogator located at the surface; and an array of electromagnetic sensors integrally formed in the fiber optic cable and configured to detect the electromagnetic radiation radiated through the subsurface formation. A method of detecting electromagnetic radiation at the surface of an oil well includes transmitting, from an electromagnetic transmitter, electromagnetic radiation into a subsurface formation; and
(Continued)

sensing, from the subsurface formation, electromagnetic radiation at the surface of the oil well.

22 Claims, 8 Drawing Sheets

(51) Int. Cl.
*E21B 47/125* (2012.01)
*E21B 47/06* (2012.01)
*G01V 3/34* (2006.01)

(56) References Cited

U.S. PATENT DOCUMENTS

| | | | |
|---|---|---|---|
| 8,633,700 B1 * | 1/2014 | England | G01V 3/12 |
| | | | 324/348 |
| 9,091,785 B2 | 7/2015 | Donderici et al. | |
| 2006/0289724 A1 * | 12/2006 | Skinner | G01D 5/268 |
| | | | 250/221 |
| 2011/0001482 A1 | 1/2011 | Alumbaugh et al. | |
| 2011/0140907 A1 * | 6/2011 | Louden | E21B 47/123 |
| | | | 340/854.3 |
| 2014/0097848 A1 | 4/2014 | Leblanc et al. | |
| 2014/0126331 A1 | 5/2014 | Skinner | |
| 2014/0139226 A1 | 5/2014 | Jaaskelainen et al. | |
| 2014/0175271 A1 | 6/2014 | Samson | |
| 2014/0191120 A1 | 7/2014 | Donderici et al. | |
| 2014/0191761 A1 * | 7/2014 | San Martin | E21B 47/011 |
| | | | 324/339 |
| 2014/0222343 A1 | 8/2014 | Samson | |

FOREIGN PATENT DOCUMENTS

| | | |
|---|---|---|
| WO | 2015178876 A1 | 11/2015 |
| WO | 2015178878 A1 | 11/2015 |
| WO | 2014120305 A1 | 8/2017 |

* cited by examiner

SYSTEMS AND METHODS FOR SURFACE DETECTION OF ELECTROMAGNETIC SIGNALS FROM SUBSURFACE ENVIRONMENTS

CROSS-REFERENCE TO RELATED APPLICATIONS

This application is a national stage entry of PCT/US2015/065830 filed Dec. 15, 2015, said application is expressly incorporated herein in its entirety.

FIELD

Oil field operators drill boreholes into subsurface reservoirs to recover oil and other hydrocarbons. The present disclosure relates generally to monitoring drilling operations using fiber optic electromagnetic field sensors. More specifically, the present disclosure relates to the detection and measurement of drilling parameters and subsurface formation properties at the surface of an oil well using fiber optic electromagnetic field sensors.

BACKGROUND

During oil and gas exploration and production, many types of information are collected and analyzed. Such information typically includes characteristics of the earth formation traversed by a borehole, and data relating to the size and configuration of the borehole itself. The information can also be used to determine the quantity and quality of hydrocarbons in a reservoir, and to develop or modify strategies for hydrocarbon production. In general, sensor-based data acquisition occurs during drilling, open-hole logging, well completion, treatment applications, and production. One technique for collecting relevant information involves transmitting electromagnetic (EM) fields from a downhole system and receiving either magnetic or electric fields emanating from the downhole system with sensors at the surface.

Magnetic field sensors generally have a wire coil and related circuitry to measure the current induced in the wire coil by a time-varying magnetic flux density. The measured currents are communicated to a recording unit and/or processing unit via an electrical telemetry system, where one or more stages of amplification are typically employed. Electric field sensors work similarly except they usually contain an antenna and electric fields are measured by measuring the voltage generated across the antenna by the fields.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or apparatus. Additionally, the illustrated embodiments are illustrated such that the orientation is such that the right-hand side or bottom of the page is downhole compared to the left-hand side, and the top of the page is toward the surface, and the lower side of the page is downhole.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connections can be such that the objects are permanently connected or releasably connected. The term "outside" refers to a region that is beyond the outermost confines of a physical object. The term "axially" means substantially along a direction of the axis of the object. If not specified, the term axially is such that it refers to the longer axis of the object. The terms "comprising," "including" and "having" are used interchangeably in this disclosure. The terms "comprising," "including" and "having" mean to include, but are not necessarily limited to, the things so described.

Disclosed herein are devices, systems, and methods directed to electromagnetic (EM) field monitoring systems employing electric field and/or magnetic field sensors coupled with a transducer. For example, an EM field monitoring systems for a downhole, or subsurface, environment can include an EM radiation source to emit an EM wave into a subsurface rock formation, a fiber optic cable located at the surface of the oil well, and an array of electric field and/or magnetic field sensors coupled with the fiber optic cable.

The electrical field and magnetic field sensors preferably employ fully optical means to measure EM fields and EM field gradients at surface locations near the oil well and transfer the measurement information through the fiber optic cable to a transducer. The EM field sensor can contain, for example, a piezo-stretcher or an atomic magnetometer. The transducer can be, for example, an electro-optical transducer or fiber optic interrogator.

Figure 1:
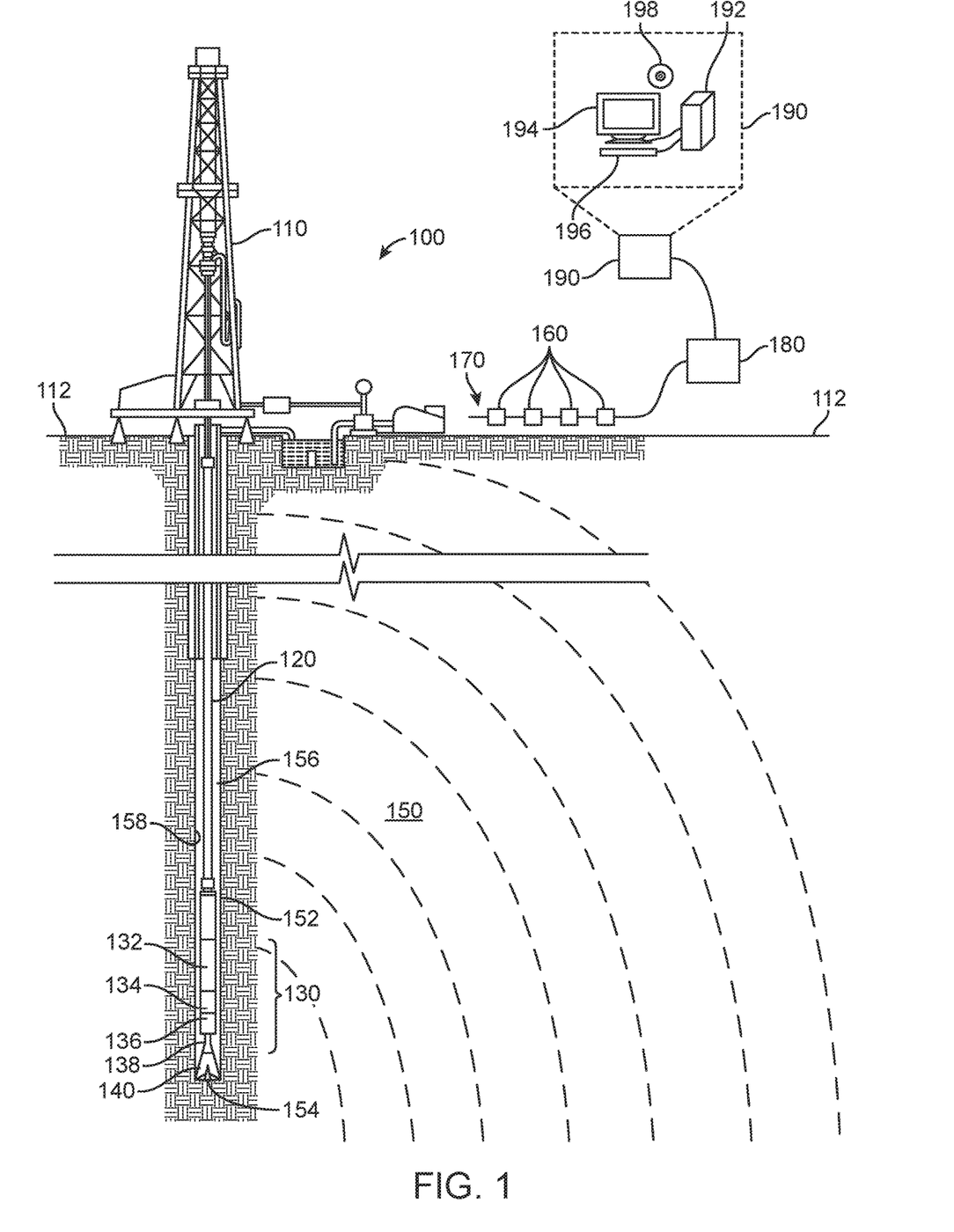
FIG. 1 is a diagram of a wellbore operating environment in which a drilling tool having an EM transmitter is deployed in accordance with certain embodiments of the present disclosure.

FIG. 1 illustrates a schematic view of an embodiment of a wellbore operating environment in which a drilling tool having an EM transmitter may be deployed. As depicted, the operating environment 100 includes a drill rig 110 located on the surface 112 of the earth, a drill string 120, and a motor assembly 130 coupled to a drill bit 140. The motor assembly 130 can convert hydraulic energy of a drilling fluid, such as drilling mud, into mechanical energy in the form of rotational speed and torque output, which may be harnessed for a variety of applications such as downhole drilling. The motor assembly 130 can generally include a drive section 132, a bearing pack 136, and a driveshaft 138 coupled to the drill bit 140. The motor assembly 130 can include various measurement while drilling (MWD) components, including an EM transmitter housing 134.

With force or weight applied to the drill bit 140 via the drill string 120 and/or the fluid-driven motor assembly 130, the rotating drill bit 140 engages the subsurface formation 150 and proceeds to form a wellbore 152 along a predetermined path toward a target zone. As the drill bit 140 engages the formation, resistive torques generally opposing the rotation of the drill bit 140 and the rotor are applied to the drill bit 140 by the formation 150. The drilling fluid or mud pumped down the drill string 120 and through the motor assembly 130 passes out of the drill bit 140 through nozzles positioned in the bit face. The drilling fluid cools the drill bit 140 and flushes cuttings away from the face of bit 140. The drilling fluid and cuttings are forced from the bottom 154 of the wellbore 150 to the surface through an annulus 156 formed between the drill string 120 and the wellbore sidewall 158.

The EM transmitter housing 134 has an EM transmitter (not shown) disposed therein. The EM transmitter, which may include an antenna, is configured to radiate propagating waves of electric and/or magnetic fields from the transmitter toward an array of optical EM field sensors 160 positioned on the surface 112 of the operating environment 100. The EM transmitter can be powered by one or more batteries located within the housing 134 or by a turbine in the downhole assembly. The array of optical EM field sensors 160 are coupled with a fiber optic cable 170. In some instances, the EM field sensors contain piezo-stretchers or atomic magnetometers. The fiber optic cable 170 is coupled with a transducer 180. In some instances, the transducer 180 is an electro-optical transducer. In some instances, the transducer 180 is a fiber optic interrogator.

The transducer 180 receives EM radiation measurements obtained from the array of EM field sensors 160 via the fiber optic cable 170 in the form of optical data. In some instances, the transducer 180 and/or the computer system 190 may perform various operations such as converting the received signals from one format to another, storing the EM field measurements, processing the measurements, deriving data tables from the measurements, and/or displaying the data tables or other data. In some instances, the computer system 190 includes a processing unit 192 that performs EM field measurement analysis operations by executing software or instructions obtained from a local or non-transitory computer-readable medium 198. The computer system 190 can also include input device(s) 196 (for example, a keyboard, a mouse, a touchpad, etc.) and output device(s) 194 (for example, a monitor, a printer, etc.). Such input device(s) 196 and/or output device(s) 194 provide a user interface that enables an operator to interact with the processing unit 192 to, for example, select EM field measurement analysis options, to monitor measurements in real-time, to view analysis results, and/or perform other tasks.

Even though FIG. 1 depicts a vertical wellbore 152, the present disclosure is equally well-suited for use in wellbores having other orientations including horizontal wellbores, slanted wellbores, multilateral wellbores or the like. Also, even though FIG. 1 depicts an onshore operation, the present disclosure is equally well-suited for use in offshore operations. In offshore operations, the array of sensors 160, fiber optic cable 170 and interrogator 180 can be placed on the sea floor and EM field data can be transmitted, either wirelessly or via a wired connection, from the interrogator 180 to the computer system 190 which may be located above water. Further, the present disclosure is equally well-suited for use in cased-hole or open-hole operating environments.

Figure 2:
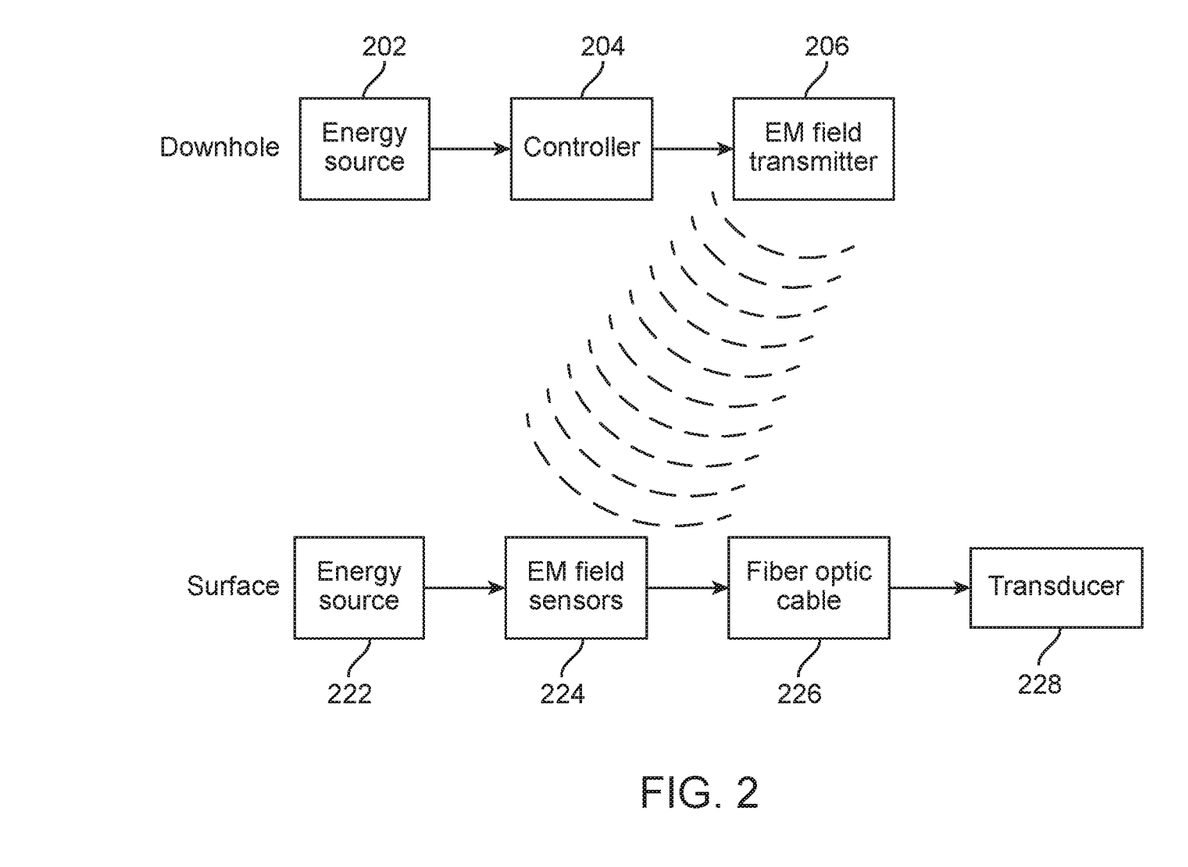
FIG. 2 is a block diagram of an EM field monitoring system employing EM field sensors, with a downhole transmitter and receivers located at the surface of the earth around an oil well, to convert a property of the surrounding EM field into a signal that can be sensed via an optical fiber in accordance with certain embodiments of the present disclosure.

FIG. 2 is a block diagram of an EM field monitoring system employing EM field sensors, located at the surface of the earth around an oil well, to convert a property of the surrounding EM field into a signal that can be sensed via an optical fiber. As shown in FIG. 2, an energy source 202 can be provided to power a portion of the monitoring system operations. The energy source 202 can be, for example, one or more batteries located in the EM field transmitter housing 134, or a downhole turbine in a portion of the drill string 120 or in any component coupled with the drill string 120. An energy saving scheme can be used to turn the monitoring system on or off periodically or situationally. The power level of the energy source 202 can be adjusted based on control signals or in response to measurements obtained by sensors 160.

A controller 204 coupled with the energy source 202 provides power to the EM transmitter 206. In some instances, the controller 204 can include a microprocessor and a random access memory. Transmission by the EM transmitter 206 can be time activated or based on an input signal provided to the controller 204. When more than one EM transmitter 206 is used, each EM transmitter 206 can be activated sequentially or in parallel to inject radiation into the formation.

Also as shown in FIG. 2, an energy source 222 provides power to the array of EM field sensors 224 at the surface 112. The energy source 222 can be, for example, a pair of conductors conveying power from an area of the surface 112 different from where the array of EM field sensors 224 are located on the surface 112. Alternatively, one or more batteries can be used to power the array of EM field sensors 224. An energy saving scheme can be used to turn the monitoring system on or off periodically or situationally. EM field sensors 224 are employed at the surface 112 to measure EM field strength or gradient. In operation, the wavelength or phase shifts of light emitted by the sensors 224 along fiber optic cable 226 and are correlated with a measure of the EM field strength or gradient. The fiber optic cable 226 is coupled with a transducer 228 that converts the received light into digital or analog data. The transducer 228 can be, for example, an electro-optical transducer or a fiber optic interrogator. The power level of the energy source 222 can be adjusted based on control signals or in response to data obtained by sensors 224. Stacking of sequential measurements can be used to improve signal-to-noise ratio.

Figure 3A:
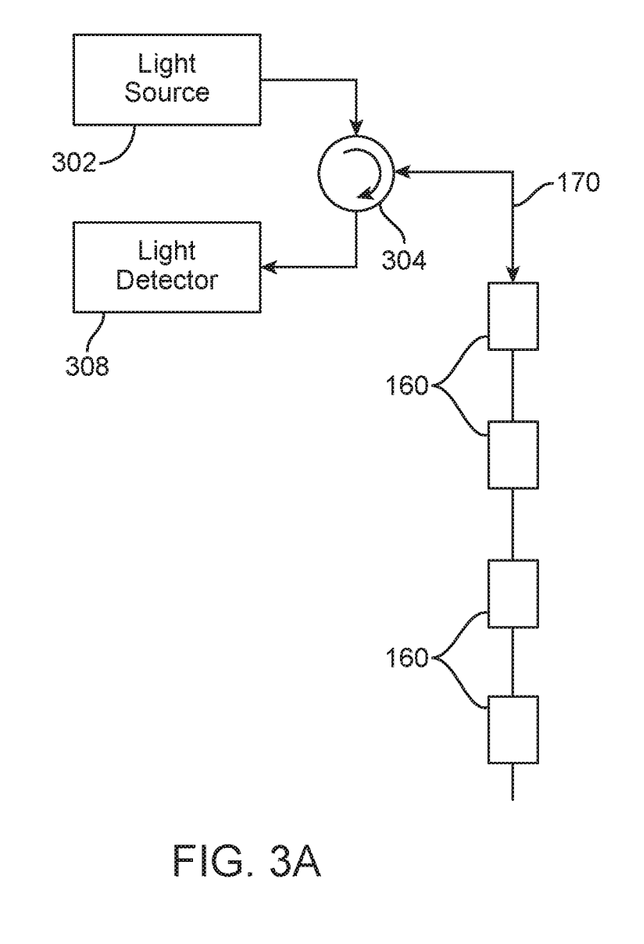
FIG. 3A is a diagram of a EM field sensor array in accordance with certain embodiments of the present disclosure.
Figure 3B:
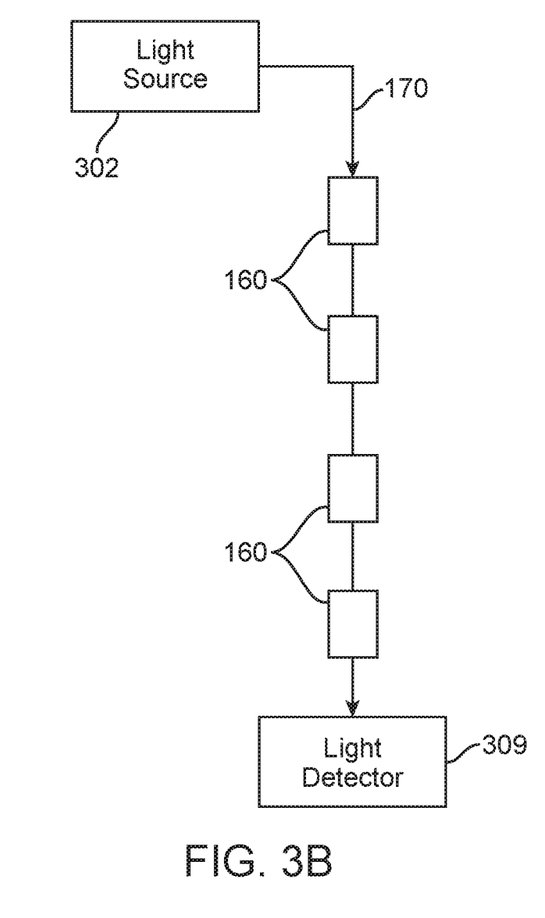
FIG. 3B is a diagram of another EM field sensor array in accordance with certain embodiments of the present disclosure.
Figure 4:
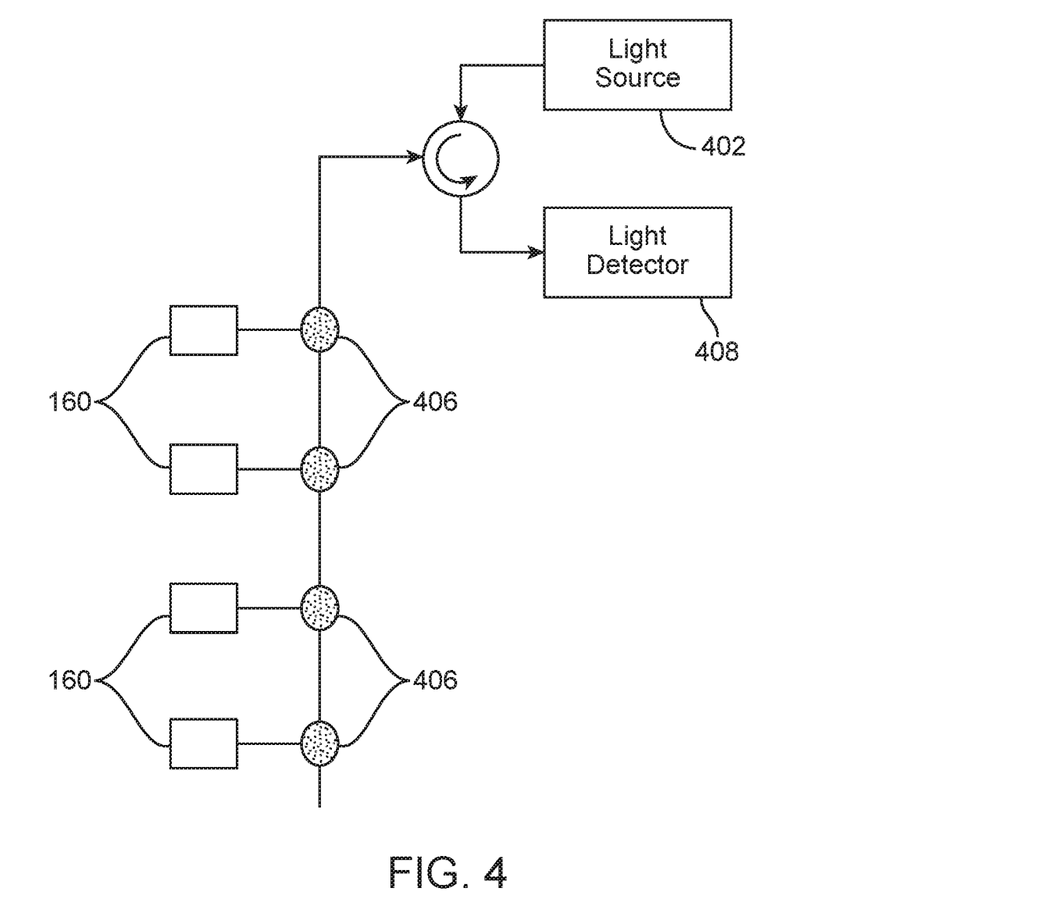
FIG. 4 is a diagram of another EM field sensor array in accordance with certain embodiments of the present disclosure.

In some instances, time and/or wavelength multiplexing can be used to separate the measurements associated with each optical EM field sensor 160 along fiber optic cable 170. FIGS. 3A, 3B and 4 illustrate exemplary multiplexing architectures for EM field sensing. In FIG. 3A, a light source 302 emits light in a continuous, broadband spectrum. A circulator 304 directs light along the fiber optic cable 170. The light travels along the fiber optic cable 170, interacting with each of the array of optical EM field sensors 160 capable of measuring EM field strength or gradient. For example, the optical EM field sensors 160 are configured to reflect light, where the wavelength of the wavelength depends on the amount of strain applied to the optical EM field sensors 160 in an EM field. Light from sensors 160 returns from the circulator 308, which directs the light to a light detector 308. The light detector 308 separates the measurements associated with different sensors 160 via wavelength multiplexing. That is, each sensor 160 reflects only a narrow wavelength band, and each sensor 160 is designed to affect a different wavelength band. The light source 302, circulator 304, and light detector 308, can be incorporated within the transducer 180 or can located between the fiber optic cable 170 and the transducer 180 and communicatively coupled with both.

Alternatively, in FIG. 3B, a light source 302 emits light in a continuous, broadband spectrum. This light travels along the fiber optic cable 170, interacting with each of the array of optical EM field sensors 160 capable of measuring EM field strength or gradient. For example, the optical EM field sensors 160 are configured to reflect light, where the wavelength of the wavelength depends on the amount of strain applied to the optical EM field sensors 160 in an EM field. Light from sensors 160 continues along cable 170 which directs the light to a light detector 309. The light detector 308 separates the measurements associated with different sensors 160 via wavelength multiplexing. That is, each sensor 160 blocks only a narrow wavelength band, and each sensor 160 is designed to affect a different wavelength band. The light source 302, and light detector 309, can be incorporated within the transducer 180 or can located between the fiber optic cable 170 and the transducer 180 and communicatively coupled with both. We note that in FIG. 3A, the detector 308 receives only narrow band reflections from the sensors 160 while in FIG. 3B, detector 309 receives essentially the full, broadband light signal generated by the source 302, but with "notches" in the spectrum indicative of the electromagnetic fields detected at the various sensors 160. FIGS. 3A and 3B illustrate wavelength division multiplexing.

In FIG. 4, a light source 402 emits light in the form of short pulses. Each sensor 160 is coupled with the fiber optic cable 170 via a splitter 406. The splitters 406 direct a small fraction of the light from the fiber optic cable 170 to its corresponding sensor 160 (for example, 1-10%). Each sensor 160 is excited by the light and responsively generates a reflected pulse back to a light detector 408 via each splitter 406, the fiber optic cable 170, and the circulator 404. Due to the different travel distances, each pulse from light source 402 results in a sequence of return pulses, with the first pulse arriving from the nearest sensor 160, the second pulse arriving from the second nearest sensor 160, and so on. Depending on the construction of the sensors, 160, either the amplitude or the wavelength of the reflected pulses is indicative of the electromagnetic field detected by the sensor. This arrangement enables the detector 408 to separate sensor measurement of a time multiplexed basis. The light source 402, circulator 404, and light detector 408, can be incorporated within the transducer 180 or can located between the fiber optic cable 170 and the transducer 180 and communicatively coupled with both.

The arrangements of FIGS. 3A, 3B and 4 are reflective arrangements in which the light returns along the same fiber from EM radiation sensors. In some instances, multiple sensors can be coupled in series on each branch of the FIG. 4 arrangement. A combination of time division and wavelength division multiplexing could be used to separate the individual sensor measurements.

Thus each oil well can be equipped with a permanent array of sensors distributed radially, concentrically, in a grid-like fashion, or any other suitable distribution on the surface 112 of the operating environment 100 around the oil well. The sensors can be freely placed on the surface 112 of the operating environment 100 or can be secured onto the surface 112 of the operating environment 100. Alternatively, the sensors can be at least partially embedded into the surface 112 of the operating environment 100. Sensor transducers can communicatively couple with the fiber optic cable or, in some instances, produce electrical signals that in turn induce thermal, mechanical (strain), acoustic or electromagnetic effects on the fiber. Each fiber optic cable can be associated with a single or multiple EM sensors, while each sensor can produce a signal in multiple fiber optic cables.

The sensors 160 discussed above preferably employ fully optical means to measure EM fields and EM field gradients on the surface of an oil well and transfer the measurement through optical fibers for processing to extract the measurement information. The sensors 160 will preferably operate passively but can be powered by any suitable means such as batteries, wired A/C power, power from solar panels, or any other suitable power source. The positioning of the sensors 160 and optic fiber cables 170 on the surface of the oil well allows for easy access and repair of the sensors 160, fiber optic cables 170 and/or associated power sources. The ease of access and repair of the sensors 160 and cables 170 is advantageous over previous methods and systems using downhole placement of similar fiber optic cables and sensor arrays. The surface location of the sensors 160 and fiber optic cables 170 are also advantageous over other previous methods and systems where sensor arrays are placed in other well bores adjacent or near the oil well of interest because, in addition to the issues associated with access and repair of downhole sensors, no well bores need to be drilled merely for placement of the sensors.

Figure 5A:
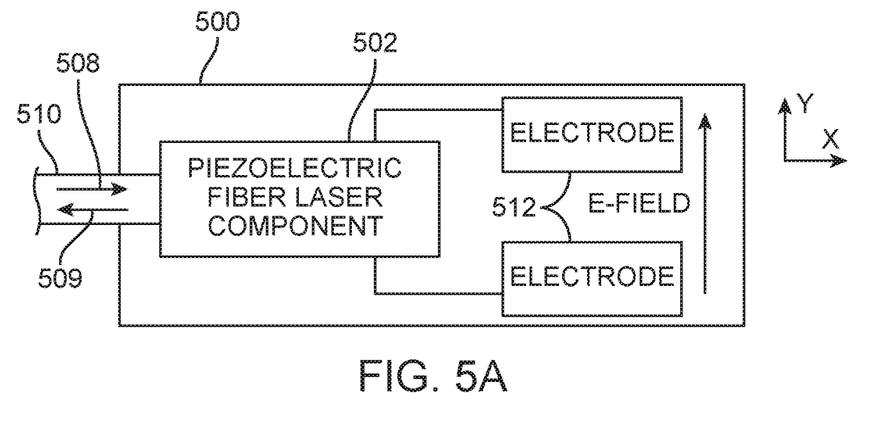
FIG. 5A is a diagram of an E-field sensor in accordance with certain embodiments of the present disclosure.

FIGS. 5A, 5B, 6A and 6B show illustrative sensor configurations. In FIG. 5A, sensor 500 is configured as an E-field sensor. As shown, the sensor 500 is positioned along a fiber optic cable 510 and includes a piezoelectric fiber laser component 502 coupled with electrodes 512. The electrodes are configured to output a voltage level corresponding to an electromagnetic field strength or gradient to the piezoelectric fiber laser component 502.

In some instances, the piezoelectric fiber laser component 502 includes piezoelectric material responsive to voltage variation and bonded to a doped fiber portion within which a Bragg grating is formed. Each end of the doped fiber portion is spliced to a passive fiber. When a pump beam 508 travelling along cable 510 arrives at the piezoelectric fiber laser component 502, a laser emission beam 509 is generated by the piezoelectric fiber laser component 502 and is output to the cable 510. The wavelength of the emission beam 509 depends on various factors such as the pitch of the Bragg grating and the doping material used. The wavelength of the pump beam 508 also can be selected in accordance with the doping material used in the piezoelectric fiber laser component 502.

In the presence of an E-field, the electrodes 512 apply a voltage to the piezoelectric material of the piezoelectric fiber laser component 502, which causes the piezoelectric material to expand or contract in one or more directions. Because the piezoelectric material is bonded to the fiber laser, a corresponding strain the of fiber laser results, which affects the grating pitch. Accordingly, the wavelength of the emission beam 509 can be correlated to the amount of strain applied to the laser fiber due to the E-field strength or gradient.

In FIG. 5A, the electrodes 512 are configured to detect a particular E-field orientation (along the Y direction shown in FIG. 5A). To detect another E-field orientation, the electrodes 512 can be oriented differently, additional electrodes 512 can be employed, or nearby sensors 500 can be oriented differently.

Figure 5B:
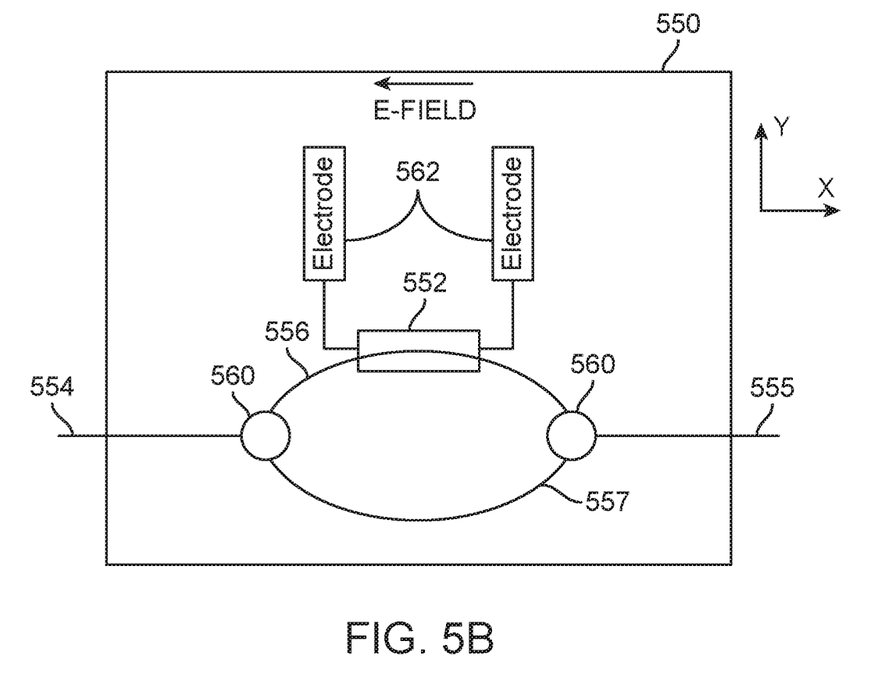
FIG. 5B is a diagram of another E-field sensor in accordance with certain embodiments of the present disclosure.

In some instances, the sensor includes or is coupled with an imbalanced interferometer (for example, a Mach-Zehnder interferometer) to convert the wavelength variations of the emission beam into phase or amplitude variations. In FIG. 5B, sensor 550 is configured as an E-field sensor. As shown, the sensor 550 is positioned between a pump beam fiber optic cable 554 and an emission beam fiber optic cable 555. The pump beam fiber optic cable 554 and emission beam fiber optic cable 555 are optically coupled with a fiber optic cable 556 and a fiber optic cable 557 via couplers 560. The sensor 550 further includes a piezoelectric fiber stretcher component 552 bonded to fiber optic cable 556 and coupled with electrodes 562. The electrodes are configured to output a voltage level corresponding to an electromagnetic field strength or gradient to the piezoelectric fiber stretcher component 552.

In the presence of an E-field, the electrodes 562 apply a voltage to the piezoelectric material of the piezoelectric fiber stretcher component 552, which causes the piezoelectric material to expand or contract in one or more directions. Because the piezoelectric material is bonded to the fiber optic cable 556, a corresponding strain of the fiber stretcher results, which affects the grating pitch. Accordingly, the wavelength of the emission beam traveling through fiber optic cable 555 can be correlated to the amount of strain applied to the fiber due to the E-field strength or gradient.

In FIG. 5B, the electrodes 562 are configured to detect a particular E-field orientation (along the X direction shown in FIG. 5B). To detect another E-field orientation, the electrodes 562 can be oriented differently, additional electrodes 562 can be employed, or nearby sensors 550 can be oriented differently.

Figure 6A:
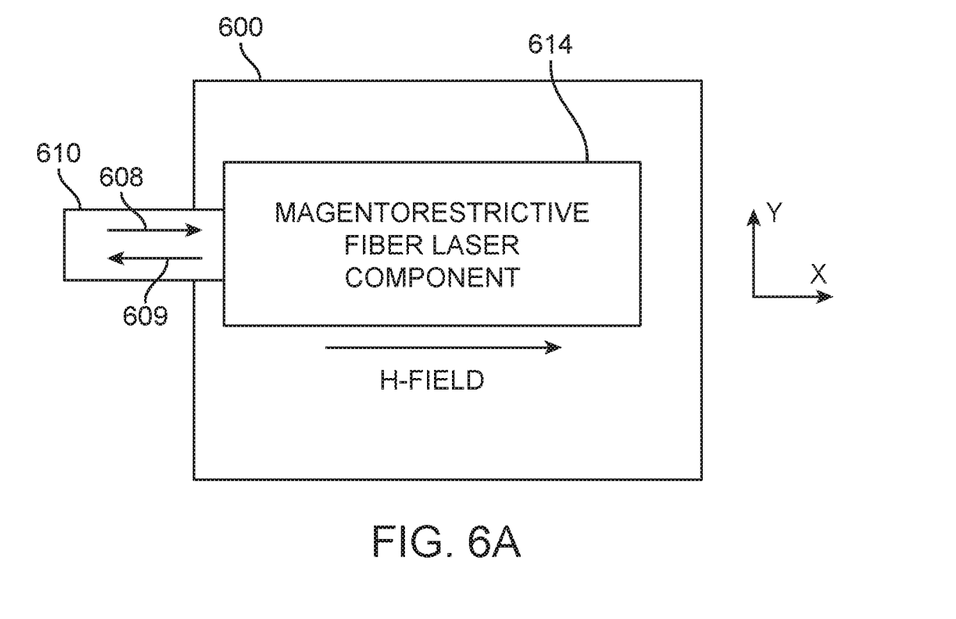
FIG. 6A is a diagram of an H-field sensor in accordance with certain embodiments of the present disclosure.

In FIG. 6A, sensor 600 is configured as an H-field sensor. As shown, the sensor 600 is positioned along the fiber optic cable 610 and includes a magnetorestrictive fiber laser component 614. The magnetorestrictive fiber laser component 614 includes a magnetorestrictive material responsive to magnetic fields and bonded to a doped fiber portion within which a Bragg grating is formed. When a pump beam 608 travelling along the fiber optic cable 610 arrives to magnetorestrictive fiber laser component 614, a laser emission beam 609 is generated by the magnetorestrictive fiber laser component 614 and is output to the fiber optic cable 610. The wavelength of the emission beam 609 depends of various factors such as the pitch of the Bragg grating and the doping material used. The wavelength of the pump beam 608 can also be selected in accordance with the doping material used for the magnetorestrictive fiber laser component 614.

In the presence of an H-field, the magnetorestrictive material of the magnetorestrictive fiber laser component 614 expands or contracts in one or more directions. Because the magnetorestrictive material is bonded to the fiber laser, a corresponding strain to the fiber laser results, which affects the grating pitch. Accordingly, the wavelength of the emission beam 609 can be correlated to the amount of strain applied to the laser due to the H-field strength or gradient.

In FIG. 6A, the magnetorestrictive fiber laser component 614 is configured to detect a particular H-field orientation (along the X direction shown in FIG. 6A). To detect another H-field orientation, the magnetorestrictive fiber laser component 614 can be oriented differently, or nearby sensors 600 can be oriented differently.

Figure 6B:
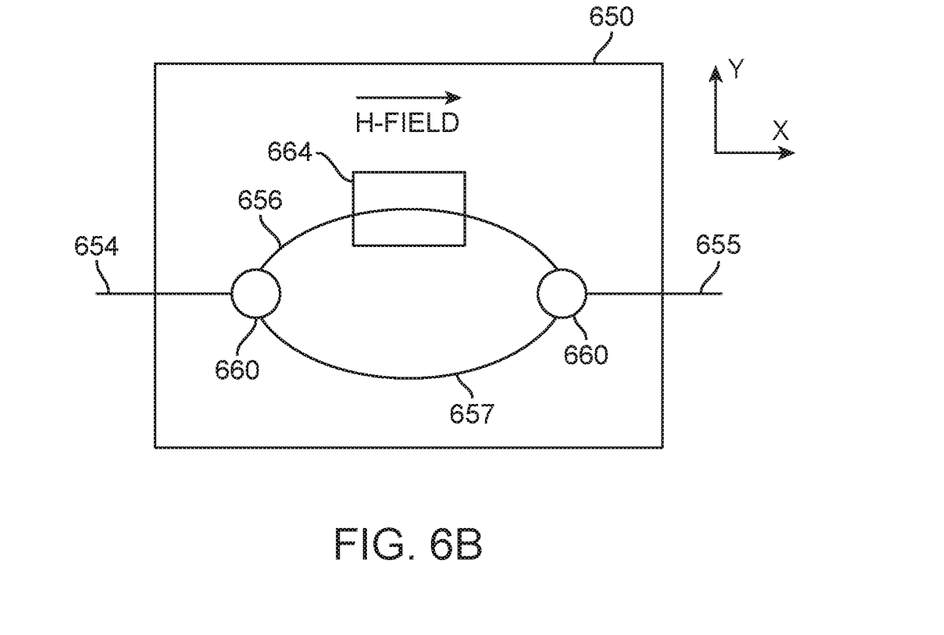
FIG. 6B is a diagram of another H-field sensor in accordance with certain embodiments of the present disclosure.

In some instances, the sensor includes or is coupled with an imbalanced interferometer (for example, a Mach-Zehnder interferometer) to convert wavelength variation of the emission beam into amplitude variations. In FIG. 6B, sensor 650 is configured as an H-field sensor. As shown, the sensor 650 is positioned between a pump beam fiber optic cable 654 and an emission beam fiber optic cable 655. The pump beam fiber optic cable 654 and emission beam fiber optic cable 655 are optically coupled with a fiber optic cable 656 and a fiber optic cable 657 via couplers 660. The sensor 650 further includes a magnetorestrictive fiber stretcher component 664. The magnetorestrictive fiber stretcher component 664 includes a magnetorestrictive material responsive to magnetic fields and bonded to a portion of fiber optic cable 656 within which a Bragg grating is formed. When a pump beam from fiber optic cable 654 travelling along the fiber optic cable 656 arrives to magnetorestrictive fiber stretcher component 664, an emission beam is generated by the magnetorestrictive fiber laser component 664 and is output to the fiber optic cable 655. The wavelength of the emission beam depends of various factors such as the pitch of the Bragg grating and the doping material used. The wavelength of the pump beam can also be selected in accordance with a doping material used for the magnetorestrictive fiber laser component 664.

In the presence of an H-field, the magnetorestrictive material of the magnetorestrictive fiber stretcher component 664 expands or contracts in one or more directions. Because the magnetorestrictive material is bonded to the fiber laser, a corresponding strain to the fiber laser results, which affects the grating pitch. Accordingly, the wavelength of the emission beam output to the fiber optic cable 655 can be correlated to the amount of strain applied to the laser due to the H-field strength or gradient.

In FIG. 6B, the magnetorestrictive fiber laser component 664 is configured to detect a particular H-field orientation (along the X direction shown in FIG. 6B). To detect another H-field orientation, the magnetorestrictive fiber laser component 664 can be oriented differently, or nearby sensors 650 can be oriented differently.

Figure 7:
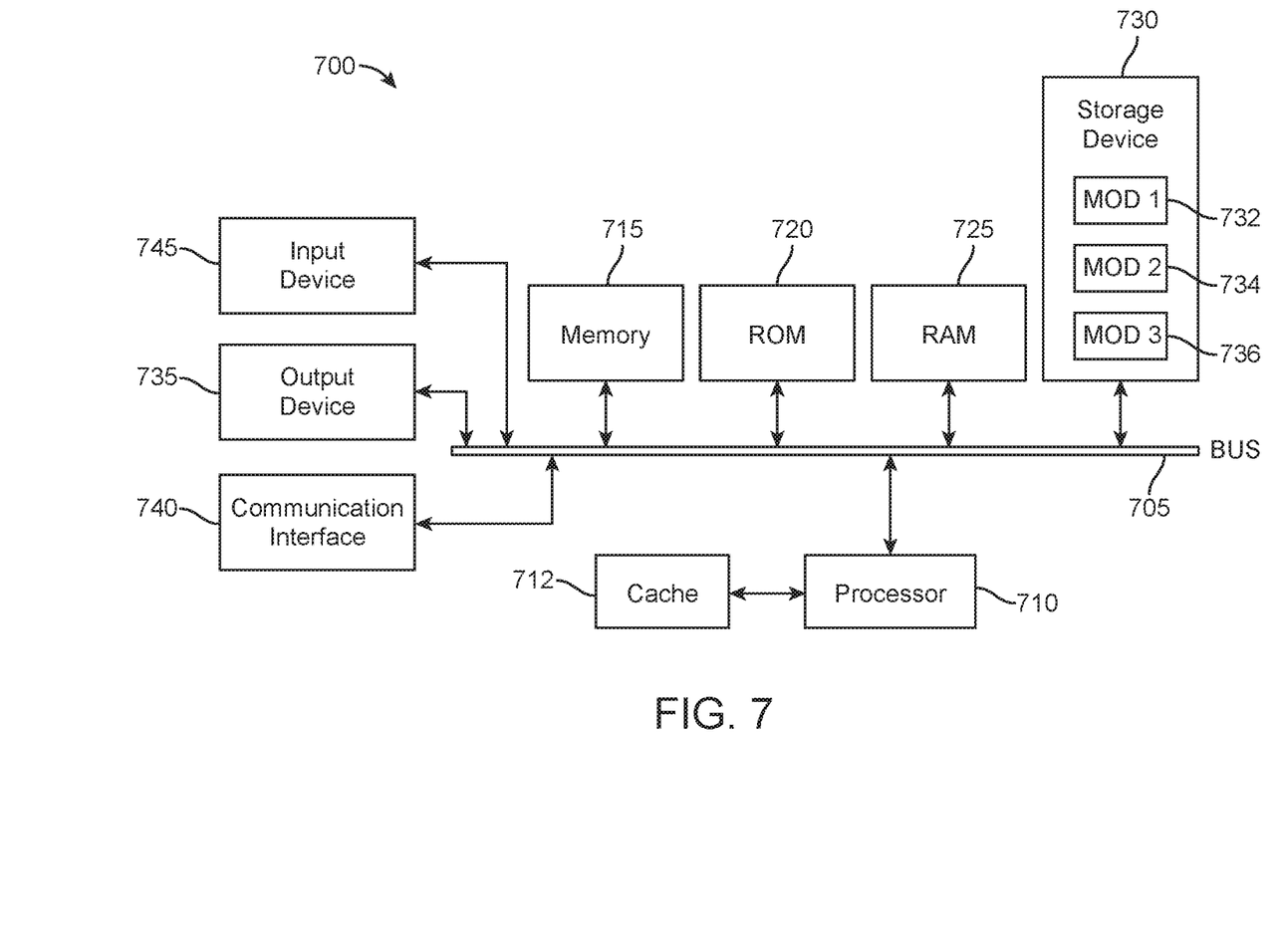
FIG. 7 is a block diagram of a computing device in accordance with certain embodiments of the present disclosure.

FIG. 7 illustrates an exemplary system embodiment which can be employed to practice the concepts, methods, and techniques disclosed herein. With reference to FIG. 7, an exemplary system and/or computing device 700 (which may be implemented with computer system 190 or controller 204 for example) includes a processing unit (CPU or processor) 710 and a system bus 705 that couples various system components including the system memory 715 such as read only memory (ROM) 720 and random access memory (RAM) 725 to the processor 710. The computing system 190 can be in the form of computing device 700 and the processing unit 192 of FIG. 1 can be in the form of processor 710. The system 700 can include a cache 712 of high-speed memory connected directly with, in close proximity to, or integrated as part of the processor 710. The system 700 copies data from the memory 715 and/or the storage device 730 to the cache 712 for quick access by the processor 710. In this way, the cache provides a performance boost that avoids processor 710 delays while waiting for data. These and other modules can control or be configured to control the processor 710 to perform various operations or actions. Other system memory 715 may be available for use as well. The memory 715 can include multiple different types of memory with different performance characteristics. It can be appreciated that the disclosure may operate on a computing device 700 with more than one processor 710 or on a group or cluster of computing devices networked together to provide greater processing capability. The processor 710 can include any general purpose processor and a hardware module or software module, such as module 1 732, module 2 734, and module 3 736 stored in storage device 730, configured to control the processor 710 as well as a special-purpose processor where software instructions are incorporated into the processor. The processor 710 may be a self-contained computing system, containing multiple cores or processors, a bus, memory controller, cache, etc. A multi-core processor may be symmetric or asymmetric. The processor 710 can include multiple processors, such as a system having multiple, physically separate processors in different sockets, or a system having multiple processor cores on a single physical chip. Similarly, the processor 710 can include multiple distributed processors located in multiple separate computing devices, but working together such as via a communications network. Multiple processors or processor cores can share resources such as memory 715 or the cache 712, or can operate using independent resources. The processor 710 can include one or more of a state machine, an application specific integrated circuit (ASIC), or a programmable gate array (PGA) including a field PGA.

The system bus 705 may be any of several types of bus structures including a memory bus or memory controller, a peripheral bus, and a local bus using any of a variety of bus architectures. A basic input/output (BIOS) stored in ROM 720 or the like, may provide the basic routine that helps to transfer information between elements within the computing device 700, such as during start-up. The computing device 700 further includes storage devices 730 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 730 can include software modules 732, 734, 736 for controlling the processor 710. The system 700 can include other hardware or software modules. The storage device 730 is connected to the system bus 705 by a drive interface. The drives and the associated computer-readable storage devices provide nonvolatile storage of computer-readable instructions, data structures, program modules and other data for the computing device 700. In one aspect, a hardware module that performs a particular function includes the software component stored in a tangible computer-readable storage device in connection with the necessary hardware components, such as the processor 710, bus 705, output device 735, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 700 is a small, handheld computing device, a desktop computer, or a computer server. When the processor 710 executes instructions to perform "operations", the processor 710 can perform the operations directly and/or facilitate, direct, or cooperate with another device or component to perform the operations.

Although the exemplary embodiment(s) described herein employs the hard disk 730, other types of computer-readable storage devices which can store data that are accessible by a computer, such as magnetic cassettes, flash memory cards, digital versatile disks (DVDs), cartridges, random access memories (RAMs) 725, read only memory (ROM) 720, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 745 represents any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems enable a user to provide multiple types of input to communicate with the computing device 700. The communications interface 740 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 710. The functions these blocks represent may be provided through the use of either shared or dedicated hardware, including, but not limited to, hardware capable of executing software and hardware, such as a processor 710, that is purpose-built to operate as an equivalent to software executing on a general purpose processor. For example the functions of one or more processors presented in FIG. 7 may be provided by a single shared processor or multiple processors (use of the term "processor" should not be construed to refer exclusively to hardware capable of executing software). Illustrative embodiments may include microprocessor and/or digital signal processor (DSP) hardware, read-only memory (ROM) 720 for storing software performing the operations described below, and random access memory (RAM) 725 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage devices. Such logical operations can be implemented as modules configured to control the processor 710 to perform particular functions according to the programming of the module. For example, FIG. 7 illustrates three modules Mod1 732, Mod2 734 and Mod3 736 which are modules configured to control the processor 710. These modules may be stored on the storage device 730 and loaded into RAM 725 or memory 715 at runtime or may be stored in other computer-readable memory locations.

One or more parts of the example computing device 700, up to and including the entire computing device 700, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 710 can include all types of processors disclosed herein, including a virtual processor. However, when referring to a virtual processor, the processor 710 includes the software components associated with executing the virtual processor in a virtualization layer and underlying hardware necessary to execute the virtualization layer. The system 700 can include a physical or virtual processor 710 that receive instructions stored in a computer-readable storage device, which cause the processor 710 to perform certain operations. When referring to a virtual processor 710, the system also includes the underlying physical hardware executing the virtual processor 710.

Figure 8:
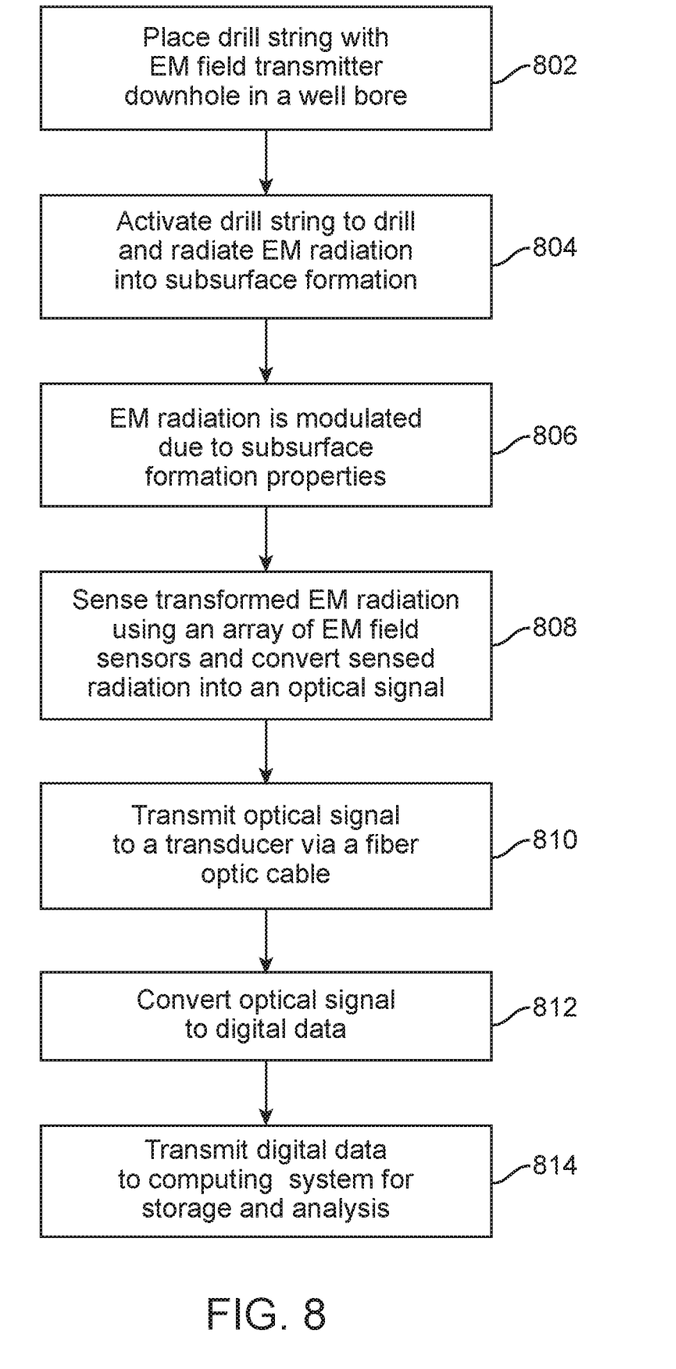
FIG. 8 is a block diagram of a method for measuring subsurface formation properties in accordance with certain embodiments of the present disclosure.

FIG. 8 is a diagram illustrating an exemplary method for measuring subsurface formation parameters. In block 802, a drill string comprising an EM transmitter is placed downhole in a well bore. In block 704, the drill string is activated to drill through the earth to lengthen the well bore. During drilling in block 804, EM radiation of a predetermined frequency is radiated from the EM transmitters into a subsurface formation. The EM radiation can be an electric field and/or a magnetic field as previously described. The EM radiation can be an alternating current (AC) field having a frequency in the range of 1-1000 Hz, alternatively 1-100 Hz, and alternatively 1-50 Hz, and alternatively 2-35 Hz. For energy efficiency, EM radiation can be transmitted periodically, during intervals as determined by a user, or in response to a drilling event such as for example, a change in speed, pressure or temperature of the drill string as it proceeds through the well bore, or a change in bit inclination angle.

In block 806, the EM radiation radiates through the subsurface formation and the EM radiation is modulated in response to properties of subsurface formation. Subsurface formation properties (that is, parameters) such as, for example, resistivity, conductivity, temperature, pressure, density and composition can all affect the degree or nature of the change of the EM radiation frequency. A change in bit inclination angle can also lead to a change in EM radiation frequency. In block 808, the transformed EM field is sensed by one or more EM field sensors of the array of EM field sensors and converted to an optical signal (that is a beam of light). Each of the sensors in the array of EM field sensors can have a sensitivity ranging from 1 µV/m to 30 mV/m, alternatively 1 µV/m to 1 mV/m, alternatively 1-100 µV/m, and alternatively 1-50 µV/m. For energy efficiency, the array of sensors can be activated and measurements can be taken periodically, during intervals as determined by a user, or activation of the EM transmitter. For further efficiency, different arrays of sensors or certain sensors within an array of sensors can be activated during different time periods.

In block 810, the converted optical signal is transmitted along a fiber optic cable to a transducer. The transducer can be, for example, an electro-optical transducer or a fiber optic interrogator. In block 812, the optical signal is converted to digital data. The measurements can be repeated and collected as a function of time. In block 814, the digital data is transmitted from the transducer to a computing system for storage and analysis of the digital data. The computing system can filter and process the digital data to calibrate them and improve signal-to-noise ratio. Suitable operations include filtering in time to reduce noise, averaging multiple sensor data to reduce noise, calculating the difference of the ratio of multiple voltages to remove unwanted effects such as a common voltage drift due to temperature, other temperature corrections schemes such as a temperature correction table, calibration to known/expected resistivity/conductivity values from existing well data, and array processing (software focusing) of the data to achieve different depth of detection or vertical resolution. Effects due to tubing, casing, mud and other downhole materials can be removed from the digital data by applying a correction factor derived from a priori information indicative of these materials.

The foregoing sensors are merely illustrative examples and not intended to limit the sensors or configurations that can be employed in the systems and methods disclosed herein. Sensors as described herein can be employed to measure EM field strength or gradient at the surface of an oil well. The emission beams generated by the sensors are multiplexed and demodulated as needed to decode measurement information. Sensors as described herein can be single-mode or multi-mode. Arrays of sensors 500 and/or 600 can be positioned on the surface around the oil well and oriented differently to detect EM fields. The measurements from such sensors are encoded in the output light and travel through one or more fiber optic cables to a processing unit. In the processing unit, the EM field measurements are extracted. The EM field measurements can be used to derive subsurface resistivity maps, conductivity maps, and/or fluid maps.

Statements of the Disclosure Include:

Statement 1: An electromagnetic field monitoring system comprising an electromagnetic transmitter located downhole in a well bore and configured to radiate electromagnetic radiation into a subsurface formation; a fiber optic cable coupled with a transducer, the fiber optic cable and the transducer located at the surface; and an array of electromagnetic field sensors integrally formed in the fiber optic cable and configured to detect the electromagnetic radiation radiated through the subsurface formation.

Statement 2: The system according to Statement 1, further comprising a data processing system configured to receive and model measurements obtained by the array of electromagnetic sensors via the transducer.

Statement 3: The system according to any one of Statements 1 or 2, wherein the electromagnetic transmitter is an electric dipole generating source.

Statement 4: The system according to any one of Statements 1 or 2, wherein the electromagnetic transmitter is a magnetic dipole generating source.

Statement 5: The system according to any one of Statements 1-2 or 4, wherein one or more of the sensors provide a measure of magnetic field strength or gradient.

Statement 6: The system according to any one of Statements 1-2 or 4-5, wherein one or more of the sensors are atomic magnetometers.

Statement 7: The system according to any one of Statements 1-2 or 4-6, wherein one or more of the sensors comprise a magnetorestrictive material that displaces a reflective surface or stretches a fiber Bragg grating in response to the magnetic field.

Statement 8: The system according to any one of Statements 1-2 or 4-7 wherein one or more of the sensors provide a measure of a magnetic field derivative.

Statement 9: The system according to any one of Statements 1-3, wherein one or more of the sensors provide a measure of electric field strength or gradient.

Statement 10: The system according to any one of Statements 1-3 or 9, wherein one or more of the sensors comprise a piezoelectric material that displaces a reflective surface or stretches a fiber Bragg grating in response to the electric field.

Statement 11: An electromagnetic field monitoring system comprising a drilling tool couplable with a tool string; an electromagnetic transmitter incorporated within the drilling tool and configured to radiate electromagnetic radiation into a subsurface formation; a fiber optic cable coupled with a transducer, the fiber optic cable and the transducer located at the surface of the oil well; and an array of electromagnetic field sensors coupled with the fiber optic cable and configured to detect the electromagnetic radiation radiated through the subsurface formation.

Statement 12: The system according to Statement 11, wherein the electromagnetic transmitter is an electric dipole generating source.

Statement 13: The system according to any one of Statements 11 or 12, wherein one or more of the sensors provide a measure of electric field strength or gradient.

Statement 14: The system according to Statement 11, wherein the electromagnetic transmitter is a magnetic dipole generating source.

Statement 15: The system according to any one of Statements 11 or 14, wherein one or more of the sensors provide a measure of magnetic field strength or gradient.

Statement 16: A method of detecting electromagnetic radiation at the surface of an oil well comprising transmitting, from an electromagnetic transmitter, electromagnetic radiation into a subsurface formation; and sensing, from the subsurface formation, electromagnetic radiation at the surface of the oil well.

Statement 17: The method according to Statement 16, wherein the electromagnetic transmitter is an electric dipole generating source.

Statement 18: The method according to Statement 16, wherein the electromagnetic transmitter is a magnetic dipole generating source.

Statement 19: The method according to any one of Statements 16-18, wherein the electromagnetic radiation is sensed with an array of electromagnetic sensors integrally formed in a fiber optic cable.

Statement 20: The method according to any one of Statements 16-19, further comprising transmitting, via a fiber optic cable, the sensed electromagnetic radiation to a transducer; converting, at the transducer, the sensed EM radiation into electrical data; and processing, by a processing unit, the electrical data to determine one or more subsurface formation parameters.

Statement 21: The method according to Statement 20, wherein the transducer is a fiber optic interrogator.

Statement 22: The method according to Statement 20, wherein the transducer is an electro-optical transducer.

Statement 23: The method according to any one of Statements 16-22, wherein the sensed electromagnetic radiation is used to determine one or more formation parameters in real-time, the one or more formation parameters including resistivity, conductivity, pressure, temperature, and bit inclination angle.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. An electromagnetic field monitoring system comprising:
   an electromagnetic transmitter located downhole in a well bore and configured to radiate electromagnetic radiation into a subsurface formation;
   a fiber optic cable coupled with a transducer, both the fiber optic cable and the transducer located at a surface of the well bore;
   an array of electromagnetic field sensors integrally formed in the fiber optic cable at the surface and configured to detect the electromagnetic radiation radiated through the subsurface formation to the array of electromagnetic field sensors integrally formed in the fiber optic cable; and
   a data processing system configured to receive and model measurements obtained by the array of electromagnetic sensors via the transducer.

2. The system of claim 1, wherein the electromagnetic transmitter is an electric dipole generating source.

3. The system of claim 1, wherein the electromagnetic transmitter is a magnetic dipole generating source.

4. The system of claim 1, wherein one or more of the sensors provide a measure of magnetic field strength or gradient.

5. The system of claim 4, wherein the one or more of the sensors are atomic magnetometers.

6. The system of claim 4, wherein the one or more of the sensors comprise a magnetorestrictive material that displaces a reflective surface or stretches a fiber Bragg grating in response to a magnetic field.

7. The system of claim 1, wherein one or more of the sensors provide a measure of a magnetic field derivative.

8. The system of claim 1, wherein one or more of the sensors provide a measure of electric field strength or gradient.

9. The system of claim 1, wherein one or more of the sensors comprise a piezoelectric material that displaces a reflective surface or stretches a fiber Bragg grating in response to an electric field.

10. The system of claim 1, wherein each sensor of the array of electromagnetic field sensors converts the detected electromagnetic radiation into optical signal or modifies the optical signal based on the detected electromagnetic radiation.

11. An electromagnetic field monitoring system comprising:
- a drilling tool couplable with a tool string;
- an electromagnetic transmitter incorporated within the drilling tool and configured to radiate electromagnetic radiation into a subsurface formation;
- a fiber optic cable coupled with a transducer, both the fiber optic cable and the transducer located at a surface of an oil well;
- an array of electromagnetic field sensors coupled with the fiber optic cable at the surface and configured to detect the electromagnetic radiation radiated through the subsurface formation to the array of electromagnetic field sensors coupled with the fiber optic cable; and
- a data processing system configured to receive and model measurements obtained by the array of electromagnetic sensors via the transducer.

12. The system of claim 11, wherein the electromagnetic transmitter is an electric dipole generating source.

13. The system of claim 11, wherein one or more of the sensors provide a measure of electric field strength or gradient.

14. The system of claim 11, wherein one or more of the sensors provide a measure of magnetic field strength or gradient.

15. The system of claim 11, wherein the electromagnetic transmitter is a magnetic dipole generating source.

16. A method of detecting electromagnetic radiation at a surface of an oil well comprising:
- transmitting, from an electromagnetic transmitter, the electromagnetic radiation into a subsurface formation;
- sensing, from the subsurface formation, the electromagnetic radiation at the surface of the oil well radiated through the subsurface formation to an array of electromagnetic sensors integrally formed in a fiber optic cable;
- transmitting, via the fiber optic cable located at the surface, the sensed electromagnetic radiation to a transducer;
- converting, at the transducer, the sensed electromagnetic radiation into electrical data; and
- processing, by a processor, the electrical data to determine one or more subsurface formation parameters.

17. The method of claim 16, wherein the electromagnetic transmitter is an electric dipole generating source.

18. The method of claim 16, wherein the electromagnetic transmitter is a magnetic dipole generating source.

19. The method of claim 16, wherein the electromagnetic radiation is sensed with the array of electromagnetic sensors integrally formed in the fiber optic cable.

20. The method of claim 16, wherein the transducer is a fiber optic interrogator.

21. The method of claim 16, wherein the transducer is an electro-optical transducer.

22. The method of claim 16, wherein the sensed electromagnetic radiation is used to determine one or more formation parameters in real-time, wherein the one or more formation parameters are selected from at least one or more of resistivity, conductivity, pressure, temperature, or bit inclination angle.

* * * * *